(12) United States Patent
Yoshizawa et al.

(10) Patent No.: US 9,677,246 B2
(45) Date of Patent: Jun. 13, 2017

(54) WORK VEHICLE AND CONTROL METHOD FOR SAME

(71) Applicant: KOMATSU LTD., Tokyo (JP)

(72) Inventors: Masao Yoshizawa, Hiratsuka (JP); Shunsuke Miyamoto, Atsugi (JP); Yasuki Kishimoto, Hiratsuka (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/763,869

(22) PCT Filed: Dec. 9, 2014

(86) PCT No.: PCT/JP2014/082556
§ 371 (c)(1),
(2) Date: Jul. 28, 2015

(87) PCT Pub. No.: WO2015/104937
PCT Pub. Date: Jul. 16, 2015

(65) Prior Publication Data
US 2015/0361636 A1    Dec. 17, 2015

(30) Foreign Application Priority Data

Jan. 29, 2014  (JP) .................................. 2014-014215

(51) Int. Cl.
*E02F 3/42*     (2006.01)
*E02F 9/20*     (2006.01)
(Continued)

(52) U.S. Cl.
CPC .............. *E02F 3/422* (2013.01); *B60K 6/445* (2013.01); *B60K 6/54* (2013.01); *B60W 10/08* (2013.01);
(Continued)

(58) Field of Classification Search
CPC . B60K 6/445; B60K 6/365; E02F 9/20; E02F 3/42; E02F 9/22
(Continued)

(56) References Cited

U.S. PATENT DOCUMENTS

2002/0087252 A1*   7/2002  Shimizu .................. B60K 6/44
                                                                   701/84
2008/0315559 A1*  12/2008  Murakami ............. A01B 67/00
                                                                   280/446.1

(Continued)

FOREIGN PATENT DOCUMENTS

CN          102667258 A     9/2012
CN          102782221 A    11/2012
(Continued)

OTHER PUBLICATIONS

The Office Action for the corresponding Chinese application No. 201480007720.9 dated Jul. 5, 2016.
(Continued)

*Primary Examiner* — Thomas G Black
*Assistant Examiner* — Wae Louie
(74) *Attorney, Agent, or Firm* — Global IP Counselors, LLP

(57) ABSTRACT

A control unit of a work vehicle has a transmission requirement determination unit, a command-torque determination unit, and a tractive force limiting unit. The transmission requirement determination unit determines a required tractive force on the basis of an operating amount of an accelerator operating member. The required tractive force is a target tractive force of a travel device. The command-torque determination unit determines an output torque of the electric motor so that the tractive force of the vehicle reaches the required tractive force. The tractive force limiting unit reduces the required tractive force to a value less than a
(Continued)

value corresponding to the operating amount of the accelerator operating member when the vehicle is excavating.

11 Claims, 9 Drawing Sheets

(51) Int. Cl.
- *E02F 9/22* (2006.01)
- *E02F 3/34* (2006.01)
- *B60K 6/445* (2007.10)
- *B60K 6/54* (2007.10)
- *B60W 10/08* (2006.01)
- *B60W 20/00* (2016.01)

(52) U.S. Cl.
CPC ............ *B60W 20/00* (2013.01); *E02F 3/34* (2013.01); *E02F 9/2075* (2013.01); *E02F 9/2079* (2013.01); *E02F 9/2253* (2013.01); *E02F 9/2292* (2013.01); *E02F 9/2296* (2013.01); *Y10S 903/902* (2013.01)

(58) Field of Classification Search
USPC ....... 701/50, 22, 84; 280/446.1; 180/65.245; 414/685; 903/902
See application file for complete search history.

(56) References Cited

U.S. PATENT DOCUMENTS

| | | | | |
|---|---|---|---|---|
| 2010/0198466 A1* | 8/2010 | Eklund | ............ | E02F 9/26 701/50 |
| 2012/0072065 A1* | 3/2012 | Minamikawa | ......... | B60K 6/445 701/22 |
| 2013/0256053 A1* | 10/2013 | Shirao | ............ | E02F 9/22 180/305 |
| 2015/0315767 A1* | 11/2015 | Miyamoto | ............ | E02F 3/283 701/50 |
| 2015/0337877 A1* | 11/2015 | Miyamoto | ............ | B60K 6/445 60/327 |
| 2015/0361636 A1* | 12/2015 | Yoshizawa | ............ | B60K 6/445 701/50 |
| 2016/0097186 A1* | 4/2016 | Yamada | ............ | B60K 6/365 701/50 |
| 2016/0130786 A1* | 5/2016 | Miyamoto | ............ | E02F 9/2079 701/50 |
| 2016/0145836 A1* | 5/2016 | Yamada | ............ | B60K 6/387 701/50 |
| 2016/0167647 A1* | 6/2016 | Yamada | ............ | B60W 10/10 701/50 |

FOREIGN PATENT DOCUMENTS

| | | |
|---|---|---|
| JP | 2005-12900 A | 1/2005 |
| JP | 2007-182859 A | 7/2007 |
| JP | 2012-153174 A | 8/2012 |
| WO | 2006/126368 A1 | 11/2006 |

OTHER PUBLICATIONS

The International Search Report for the corresponding international application No. PCT/JP2014/082556, issued on Feb. 17, 2015.

* cited by examiner

| Work implement pump pressure (MPa) | 0 | Pp1 | Pp2 | Pp3 | Pp4 |
|---|---|---|---|---|---|
| Accelerator corrected value (%) | 100 | Aac1' (100) | Aac2' | Aac3' | Aac4' |

| Inching operating amount (%) | 0 | Aic1 | Aic2 | Aic3 | Aic4 |
|---|---|---|---|---|---|
| Accelerator correction ratio | 1 | Rac1 (1) | Rac2 | Rac3 | Rac4 |

WORK VEHICLE AND CONTROL METHOD FOR SAME

CROSS-REFERENCE TO RELATED APPLICATIONS

This application is a U.S. National stage application of International Application No. PCT/JP2014/082556, filed on Dec. 9, 2014. This U.S. National stage application claims priority under 35 U.S.C. §119(a) to Japanese Patent Application No. 2014-014215, filed in Japan on Jan. 29, 2014, the entire contents of which are hereby incorporated herein by reference.

BACKGROUND

Field of the Invention

The present invention relates to a work vehicle and a control method for the work vehicle.

Background Information A work vehicle may travel and perform work using a work implement at the same time. In this case, it is important to maintain a balance between a tractive force of the vehicle and a driving power for the work implement. For example, work may be carried out that involves traveling forward and loading a bucket while excavating dirt and driving the lift arm to raise the bucket. In this type of work, tractive force acts on the lifting force of the lift arm as a counterforce. Therefore, if the tractive force increases and the force for pushing the bucket increases excessively, it becomes difficult to raise the bucket. In this way, the load on the work implement becomes too large when the tractive force during the excavating work becomes excessive. In this case, there is a problem that work becomes difficult to perform or fuel consumption is reduced.

Accordingly, a work vehicle disclosed in Japanese Unexamined Patent Application Publication No. 2007-182859 reduces the tractive force by limiting the upper limit of a command throttle for the engine. That is, by controlling the engine so that the tractive force is reduced, an excessive load on the work implement is prevented.

SUMMARY

The inventor of the present application devised a hybrid-type work vehicle provided with a power transmission device having an electric motor. A required tractive force is determined in response to an operating amount of an accelerator operating member in the hybrid-type work vehicle. When the tractive force of the vehicle reaches the required tractive force, the output torque of the electric motor is controlled. As a result, the operator is able to obtain a desired tractive force through the operation of the accelerator operating member.

However, it is difficult to maintain a balance between the tractive force of the vehicle and the driving power of the work implement when controlling the engine as mentioned above in this hybrid-type work vehicle. That is, the tractive force of the vehicle is determined using the output torque of the electric motor in this hybrid-type work vehicle. Therefore, if the output torque of the electric motor is not lowered, the tractive force is not necessarily lowered even if the command throttle for the engine is reduced. While the tractive force can be reduced by the operator reducing the operating amount of the accelerator operating member in the hybrid-type work vehicle, the operation of the work implement and the operation of the accelerator operating member need to be harmonized, which is not easy.

An object of the present invention is to provide a work vehicle that is able to maintain a balance between the tractive force of the vehicle and the driving power of the work implement with a simple operation, and a control method for the same.

Solution to Problem

A work vehicle according to a first exemplary embodiment of the present invention is equipped with an engine, a hydraulic pump, a work implement, a power transmission device, a travel device, an accelerator operating member, and a control unit. The hydraulic pump is driven by the engine. The work implement is driven by hydraulic fluid discharged from the hydraulic pump. The power transmission device has an electric motor. The travel device causes the vehicle to travel due to driving power outputted from the power transmission device. The control unit controls the power transmission device. The control unit has a transmission requirement determination unit, a command-torque determination unit, and a tractive force limiting unit. The transmission requirement determination unit determines a required tractive force on the basis of an operating amount of the accelerator operating member. The required tractive force is a target tractive force of the travel device. The command-torque determination unit determines an output torque of the electric motor so that the tractive force of the vehicle reaches the required tractive force. The tractive force limiting unit reduces the required tractive force to a value lower than a value corresponding to the operating amount of the accelerator operating member when the vehicle is excavating.

The required tractive force is reduced to a value below a value corresponding to the operating amount of the accelerator operating member during excavating in the work vehicle according to the present exemplary embodiment. The output torque of the electric motor is determined in response to the reduced required tractive force. As a result, the tractive force of the vehicle is reduced to a value below the value corresponding to the operating amount of the accelerator operating member to suppress a load on the work implement from becoming excessive. As a result, a balance can be achieved between the tractive force of the vehicle and the driving power of the work implement with a simple operation in the work vehicle according to the present exemplary embodiment.

The tractive force limiting unit preferably corrects the operating amount of the accelerator operating member to a value smaller than the actual operating amount while the vehicle is excavating. The transmission requirement determination unit determines the required tractive force on the basis of the corrected operating amount of the accelerator operating member. In this case, the tractive force limiting unit corrects the operating amount of the accelerator operating member whereby the tractive force of the vehicle is reduced. As a result, the tractive force of the vehicle can be reduced with a simple control.

The tractive force limiting unit preferably reduces the required tractive force to a value below the value corresponding to the operating amount of the accelerator operating member while the vehicle is excavating and when a discharge pressure of the hydraulic pump is greater than a predetermined threshold. The discharge pressure of the hydraulic pump fluctuates in response to the size of the load on the work implement. Therefore, by reducing the required tractive force when the discharge pressure of the hydraulic pump is greater than the predetermined threshold, the tractive force can be reduced when a large load is applied to the work implement. As a result, the balance between the tractive force of the vehicle and the driving power of the work implement can be achieved in a suitable manner.

The tractive force limiting unit preferably reduces the required tractive force in response to the discharge pressure of the hydraulic pump. In this case, the tractive force can be adjusted in response to the size of the load in the work implement.

The work vehicle is preferably further provided with a work implement operating member for operating the work implement. The control unit preferably further has an engine requirement determination unit and a required throttle determination unit. The engine requirement determination unit determines an engine required horsepower. The required throttle determination unit determines a command throttle value for the engine on the basis of the engine required horsepower. The engine requirement determination unit determines the engine required horsepower on the basis of the transmission required horsepower, which is determined on the basis of the required tractive force, and the work implement required horsepower, which is determined on the basis of the operating amount of the work implement operating member.

In this case, the engine required horsepower is determined as a value required for achieving the work implement required horsepower even when the tractive force limiting unit reduces the required tractive force. Therefore, the required work implement required horsepower can be assured even when the tractive force limiting unit reduces the required tractive force. For example, when the tractive force is reduced due to the command throttle for the engine being limited as in a conventional work vehicle, the driving power of the hydraulic pump is reduced due to a reduction in the engine rotation speed. As a result, it is difficult to assure a required work implement required horsepower. In comparison to the conventional work vehicle, a required work implement required horsepower can be assured easily in the work vehicle according to the exemplary present embodiment.

The power transmission device preferably further has an input shaft and an output shaft and transmits driving power from the engine to the travel device. The power transmission device is configured to change a rotation speed ratio of the output shaft with respect to the input shaft by changing the rotation speed of the electric motor.

A control method according to another exemplary embodiment of the present invention is a control method for a work vehicle. The work vehicle is equipped with an engine, a hydraulic pump, a work implement, a power transmission device, a travel device, and an accelerator operating member. The hydraulic pump is driven by the engine. The work implement is driven by hydraulic fluid discharged from the hydraulic pump. The power transmission device has an electric motor. The travel device causes the vehicle to travel due to driving power outputted from the power transmission device. The control method according to the present exemplary embodiment includes first to third steps. In the first step, a required tractive force which is a target tractive force of the travel device is determined on the basis of an operating amount of the accelerator operating member. In the second step, an output torque of the electric motor is determined so that the tractive force of the vehicle reaches the required tractive force. In the third step, the required tractive force is reduced to a value below a value corresponding to the operating amount of the accelerator operating member when the vehicle is excavating.

The required tractive force is reduced to a value below the value corresponding to the operating amount of the accelerator operating member during excavating in the control method for the work vehicle according to the present exemplary embodiment. The output torque of the electric motor is determined in response to the reduced required tractive force. As a result, the tractive force of the vehicle is reduced to a value below the value corresponding to the operating amount of the accelerator operating member to suppress a load on the work implement from increasing excessively. As a result, a balance can be achieved between the tractive force of the vehicle and the driving power of the work implement with a simple operation in the control method for the work vehicle according to the present exemplary embodiment.

According to exemplary embodiments of the present invention, a work vehicle that is able to maintain balance between the tractive force of the vehicle and the driving power of the work implement with a simple operation, and a control method for the same can be provided.

DETAILED DESCRIPTION OF EXEMPLARY EMBODIMENTS

Figure 1:
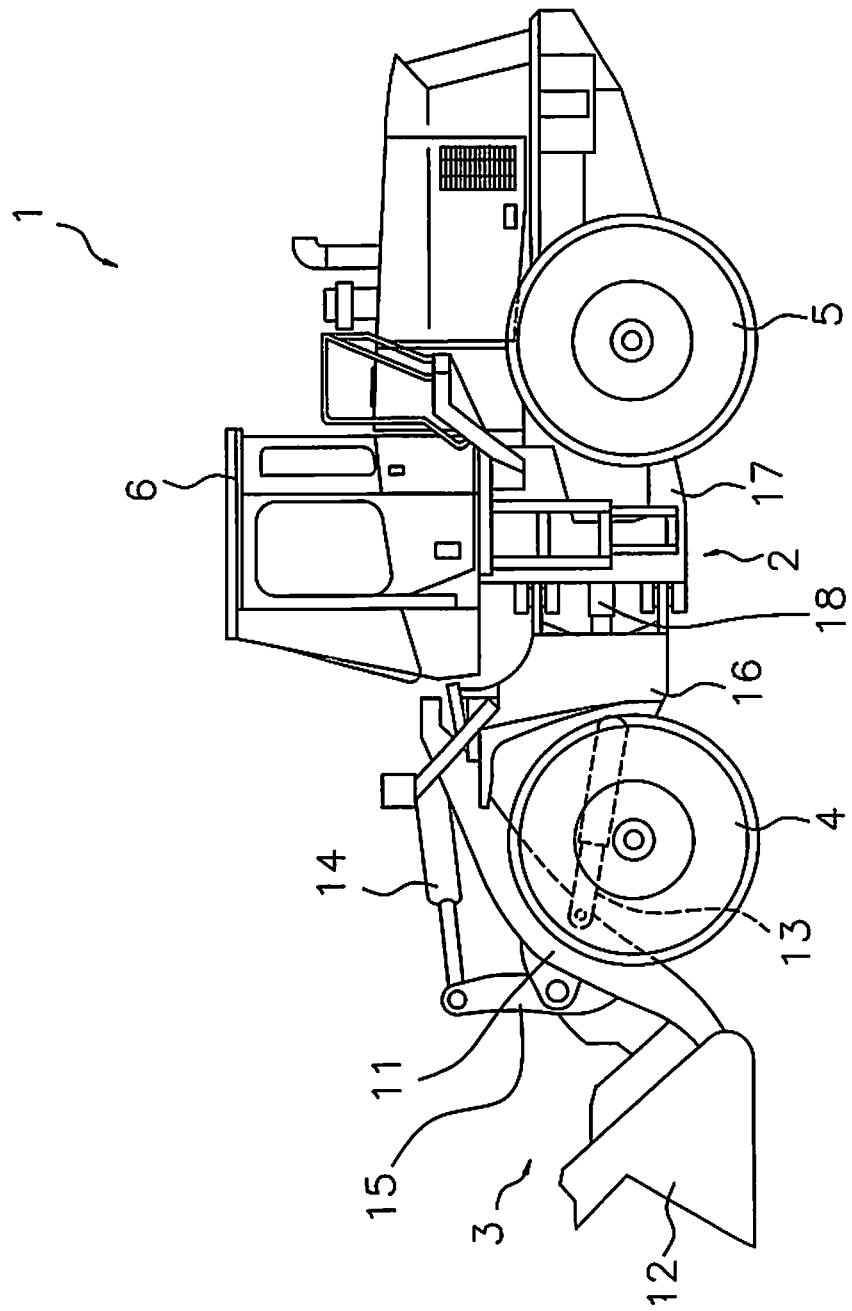
FIG. 1 is a side view of a work vehicle according to an exemplary embodiment of the present invention.

Exemplary embodiments of the present invention will be explained in detail with reference to the figures. FIG. 1 is a side view of a work vehicle 1 according to an exemplary embodiment of the present invention. As illustrated in FIG. 1, the work vehicle 1 is equipped with a vehicle body frame 2, a work implement 3, traveling wheels 4 and 5, and an operating cabin 6. The work vehicle 1 is a wheel loader and travels due to the traveling wheels 4 and 5 being rotated and driven. The work vehicle 1 is able to carry out work, such as excavation, by using the work implement 3.

The work implement 3 and the traveling wheels 4 and 5 are attached to the vehicle body frame 2. The work implement 3 is driven by hydraulic fluid from a below mentioned work implement pump 23 (see FIG. 2). The work implement 3 has a boom 11 and a bucket 12. The boom 11 is mounted on the vehicle body frame 2. The work implement 3 includes a lift cylinder 13 and a bucket cylinder 14. The lift cylinder 13 and the bucket cylinder 14 are hydraulic cylinders. One end of the lift cylinder 13 is attached to the vehicle body frame 2. The other end of the lift cylinder 13 is attached to the boom 11. The boom 11 swings up and down due to the extension and contraction of the lift cylinder 13 due to hydraulic fluid from the work implement pump 23. The bucket 12 is attached to the tip of the boom 11. One end of the bucket cylinder 14 is attached to the vehicle body frame 2. The other end of the bucket cylinder 14 is attached to the bucket 12 via a bell crank 15. The bucket 12 swings up and down due to the extension and contraction of the bucket cylinder 14 due to hydraulic fluid from the work implement pump 23.

The operating cabin 6 is attached to the vehicle body frame 2. The operating cabin 6 is mounted on the vehicle body frame 2. A seat for the operator and below mentioned operating devices are disposed in the operating cabin 6. The vehicle body frame 2 has a front frame 16 and a rear frame 17. The front frame 16 and the rear frame 17 are attached to each other in a manner that allows swinging in the left-right direction.

The work vehicle 1 has a steering cylinder 18. The steering cylinder 18 is attached to the front frame 16 and the rear frame 17. The steering cylinder 18 is a hydraulic cylinder. The work vehicle 1 is able to change the traveling direction to the right and left with the extension and contraction of the steering cylinder 18 due to hydraulic fluid from a below mentioned steering pump 30.

Figure 2:
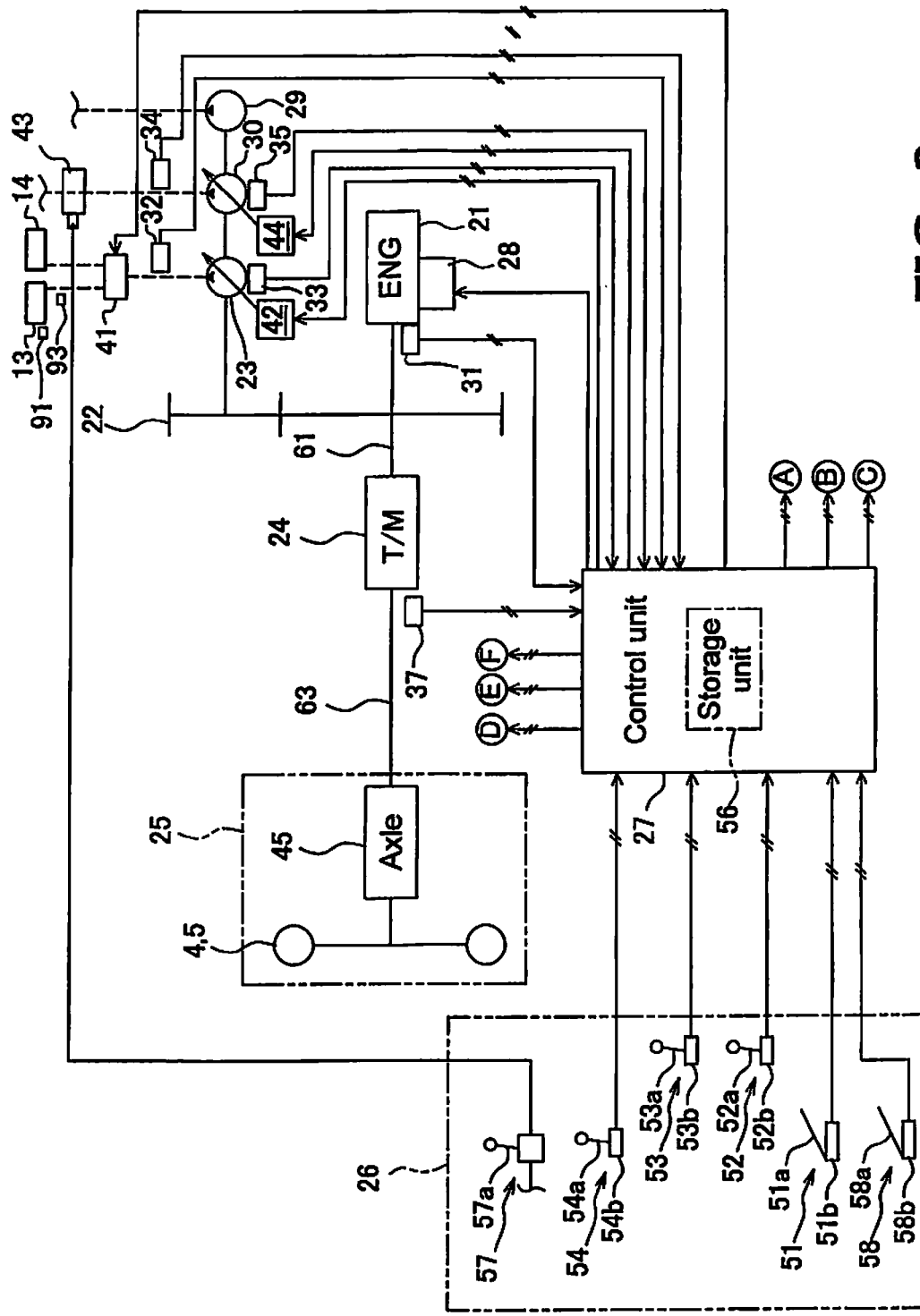
FIG. 2 is a schematic view of a configuration of the work vehicle.

FIG. 2 is a schematic view of a configuration of the work vehicle 1. As illustrated in FIG. 2, the work vehicle 1 is equipped with an engine 21, a power take-off device 22 (referred to below as a "PTO 22"), a power transmission device 24, a travel device 25, an operating device 26, and a control unit 27.

The engine 21 is, for example, a diesel engine. The output of the engine 21 is controlled by adjusting the amount of fuel injected into the cylinders of the engine 21. The adjustment of the amount of fuel is conducted by the control unit 27 controlling a fuel injection device 28 attached to the engine 21. The work vehicle 1 is equipped with an engine rotation speed detecting unit 31. The engine rotation speed detecting unit 31 detects the engine rotation speed and transmits a detection signal indicating the engine rotation speed to the control unit 27.

The work vehicle 1 has the work implement pump 23, the steering pump 30, and a transmission pump 29. The work implement pump 23, the steering pump 30, and the transmission pump 29 are hydraulic pumps. The PTO 22 (power take-off) transmits a portion of the driving power from the engine 21 to the hydraulic pumps 23, 30, and 29. That is, the PTO 22 distributes the driving power from the engine 21 to the hydraulic pumps 23, 30, and 29 and the power transmission device 24.

The work implement pump 23 is driven by driving power from the engine 21. The hydraulic fluid discharged from the work implement pump 23 is supplied to the lift cylinder 13 and the bucket cylinder 14 through a work implement control valve 41. The work vehicle 1 is equipped with a work implement pump pressure detecting unit 32. The work implement pump pressure detecting unit 32 detects a discharge pressure (referred to below as "work implement pump pressure") of hydraulic fluid from the work implement pump 23 and transmits a detection signal indicating the work implement pump pressure to the control unit 27.

The work implement pump 23 is a variable displacement hydraulic pump. The discharge capacity of the work implement pump 23 is changed by changing the tilt angle of a skew plate or an inclined shaft of the work implement pump 23. A first capacity control device 42 is connected to the work implement pump 23. The first capacity control device 42 is controlled by the control unit 27 and changes the tilt angle of the work implement pump 23. As a result, the discharge capacity of the work implement pump 23 is controlled by the control unit 27. The work vehicle 1 is equipped with a first tilt angle detecting unit 33. The first tilt angle detecting unit 33 detects the tilt angle of the work implement pump 23 and transmits a detection signal indicating the tilt angle to the control unit 27.

The first capacity control device 42 has a load sensing valve (referred to below as "LS valve"). The LS valve controls the discharge capacity of the work implement pump 23 so that a differential pressure between a discharge pressure of the work implement pump 23 and an outlet oil pressure of the work implement control valve 41 satisfies a predetermined value. Specifically, the greatest outlet oil pressure between the outlet oil pressure to the lift cylinder 13 and the outlet oil pressure to the bucket cylinder 14 is inputted by the LS valve. The LS valve controls the discharge capacity of the work implement pump 23 so that a differential pressure between the discharge pressure of the work implement pump 23 and the greatest outlet oil pressure satisfies a predetermined value.

The steering pump 30 is driven by driving power from the engine 21. The hydraulic fluid discharged from the steering pump 30 is supplied to the above mentioned steering cylinder 18 through a steering control valve 43. The work vehicle 1 is equipped with a steering pump pressure detecting unit 34. The steering pump pressure detecting unit 34 detects the discharge pressure (referred to below as "steering pump pressure") of hydraulic fluid from the steering pump 30 and transmits a detection signal indicating the steering pump pressure to the control unit 27.

The steering pump 30 is a variable displacement hydraulic pump. The discharge capacity of the steering pump 30 is changed by changing the tilt angle of a skew plate or an inclined shaft of the steering pump 30. A second capacity control device 44 is connected to the steering pump 30. The second capacity control device 44 is controlled by the control unit 27 and changes the tilt angle of the steering pump 30. As a result, the discharge capacity of the steering pump 30 is controlled by the control unit 27. The work vehicle 1 is equipped with a second tilt angle detecting unit 35. The second tilt angle detecting unit 35 detects the tilt angle of the steering pump 30 and transmits a detection signal indicating the tilt angle to the control unit 27.

The transmission pump 29 is driven by driving power from the engine 21. The transmission pump 29 is a fixed displacement hydraulic pump. Hydraulic fluid discharged from the transmission pump 29 is supplied to clutches CF, CR, CL, and CH of the power transmission device 24 via below mentioned clutch control valves VF, VR, VL, and VH.

The PTO 22 transmits a portion of the driving power from the engine 21 to the power transmission device 24. The power transmission device 24 transmits the driving power from the engine 21 to the travel device 25. The power transmission device 24 changes the speed and outputs the driving power from the engine 21. An explanation of the configuration of the power transmission device 24 is provided in detail below.

The travel device 25 has an axle 45 and the traveling wheels 4 and 5. The axle 45 transmits driving power from the power transmission device 24 to the traveling wheels 4 and 5. As a result, the traveling wheels 4 and 5 rotate. The work vehicle 1 is equipped with a vehicle speed detecting unit 37. The vehicle speed detecting unit 37 detects the rotation speed (referred to below as "output rotation speed") of an output shaft 63 of the power transmission device 24. The output rotation speed corresponds to the vehicle speed and consequently the vehicle speed detecting unit 37 detects the vehicle speed by detecting the output rotation speed. The vehicle speed detecting unit 37 detects the rotating direction of the output shaft 63. The rotating direction of the output shaft 63 corresponds to the traveling direction of the work vehicle 1 and consequently the vehicle speed detecting unit 37 functions as a traveling direction detecting unit that detects the traveling direction of the work vehicle 1 by detecting the rotating direction of the output shaft 63. The vehicle speed detecting unit 37 transmits detection signals indicating the output rotation speed and the rotating direction to the control unit 27.

The operating device 26 is operated by the operator. The operating device 26 has an accelerator operating device 51, a work implement operating device 52, a speed change operating device 53, a forward/reverse travel operating device 54 (referred to below as "FR operating device 54"), a steering operating device 57, and a brake operating device 58.

The accelerator operating device 51 has an accelerator operating member 51a and an accelerator operation detecting unit 51b. The accelerator operating member 51a is operated to set a target rotation speed of the engine 21. The rotation speed of the engine 21 is changed due to the accelerator operating member 51a being operated. The accelerator operation detecting unit 51b detects an operating amount (referred to below as "accelerator operating amount") of the accelerator operating member 51a. For example, the accelerator operating amount is displayed as a percentage with the minimum value being zero and the maximum value being 100. The accelerator operation detecting unit 51b transmits a detection signal indicating the accelerator operating amount to the control unit 27.

The work implement operating device 52 has a work implement operating member 52a and a work implement operation detecting unit 52b. The work implement operating member 52a is operated to actuate the work implement 3. The work implement operation detecting unit 52b detects a position of the work implement operating member 52a. The work implement operation detecting unit 52b outputs a detection signal indicating the position of the work implement operating member 52a to the control unit 27. The work implement operation detecting unit 52b detects an operating amount of the work implement operating member 52a (referred to below as "work implement operating amount") by detecting a position of the work implement operating member 52a.

The speed change operating device 53 has a speed change operating member 53a and a speed change operation detecting unit 53b. The operator is able to select a speed range of the power transmission device 24 by operating the speed change operating member 53a. The speed change operation detecting unit 53b detects a position of the speed change operating member 53a. The position of the speed change operating member 53a corresponds to a plurality of speed ranges such as a first speed and a second speed and the like. The speed change operation detecting unit 53b outputs a detection signal indicating the position of the speed change operating member 53a to the control unit 27.

The FR operating device 54 has a forward/reverse travel operating member 54a (referred to below as "FR operating member 54a") and a forward/reverse travel position detecting unit 54b (referred to below as a "FR position detecting unit 54b"). The operator can switch between forward and reverse travel of the work vehicle 1 by operating the FR operating member 54a. The FR operating member 54a is selectively switched between a forward travel position (F), a neutral position (N), and a reverse travel position (R). The FR position detecting unit 54b detects a position of the FR operating member 54a. The FR position detecting unit 54b outputs a detection signal indicating the position of the FR operating member 54a to the control unit 27.

The steering operating device 57 has a steering operating member 57a. The steering operating device 57 drives a steering control valve 43 by supplying pilot hydraulic pressure based on an operation of the steering operating member 57a to the steering control valve 43. The steering operating device 57 may drive the steering control valve 43 by converting an operation of the steering operating member 57a to an electrical signal. The operator is able to change the travel direction of the work vehicle 1 to the right or left by operating the steering operating member 57a.

The brake operating device 58 has a brake operating member 58a and a brake operation detecting unit 58b. The operator is able to operate a braking force of the work vehicle 1 by operating the brake operating member 58a. The brake operation detecting unit 58b detects an operating amount of the brake operating member 58a (referred to below as "brake operating amount"). The brake operation detecting unit 58b outputs a detection signal indicating the brake operating amount to the control unit 27. The pressure of the brake oil may be used as the brake operating amount.

The work vehicle 1 has a boom position detecting unit 91. The boom position detecting unit 91 detects a position of the boom 11. For example, the boom position detecting unit 91 detects a position of the boom 11 by detecting an angle of the boom 11. The boom position detecting unit 91 may be a sensor for directly detecting the angle of the boom 11. Alternatively, the boom position detecting unit 91 may detect the angle of the boom 11 by detecting a stroke amount of the lift cylinder 13. The boom position detecting unit 91 outputs a detection signal indicating the position of the boom 11 to the control unit 27.

The work vehicle 1 has a boom pressure detecting unit 93. The boom pressure detecting unit 93 detects a bottom pressure of the lift cylinder 13. The bottom pressure of the lift cylinder 13 is the pressure of hydraulic fluid inside an oil chamber at the bottom side of the side facing the lift cylinder 13. When the lift cylinder 13 extends, hydraulic fluid is supplied to the oil chamber in the bottom side of the lift cylinder 13. When the lift cylinder 13 contracts, hydraulic fluid is discharged from the oil chamber in the bottom side of the lift cylinder 13. When the boom 11 is in a holding state, an oil pressure corresponding to a load for holding the boom 11 acts on the oil chamber in the bottom side of the lift cylinder 13. The boom pressure detecting unit 93 inputs a detection signal for indicating the bottom pressure of the lift cylinder 13 to the control unit 27.

The control unit 27 has a calculation device, such as a CPU, and a memory, such as a RAM or a ROM, and conducts processing for controlling the work vehicle 1. The control unit 27 has a storage unit 56. The storage unit 56 stores programs and data for controlling the work vehicle 1. The control unit 27 controls the engine 21 by transmitting command signals indicating command throttle values to the fuel injection device 28. The control of the engine 21 by the control unit 27 is described in detail below.

The control unit 27 controls hydraulic pressure supplied to the hydraulic cylinders 13 and 14 by controlling the work implement control valve 41 on the basis of the detection signals from the work implement operation detecting unit 52b. As a result, the hydraulic cylinders 13 and 14 expand or contract to operate the work implement 3.

The control unit 27 controls the power transmission device 24 on the basis of the detection signals from each of the detecting units. The control of the power transmission device 24 by the control unit 27 is described in detail below.

Figure 3:
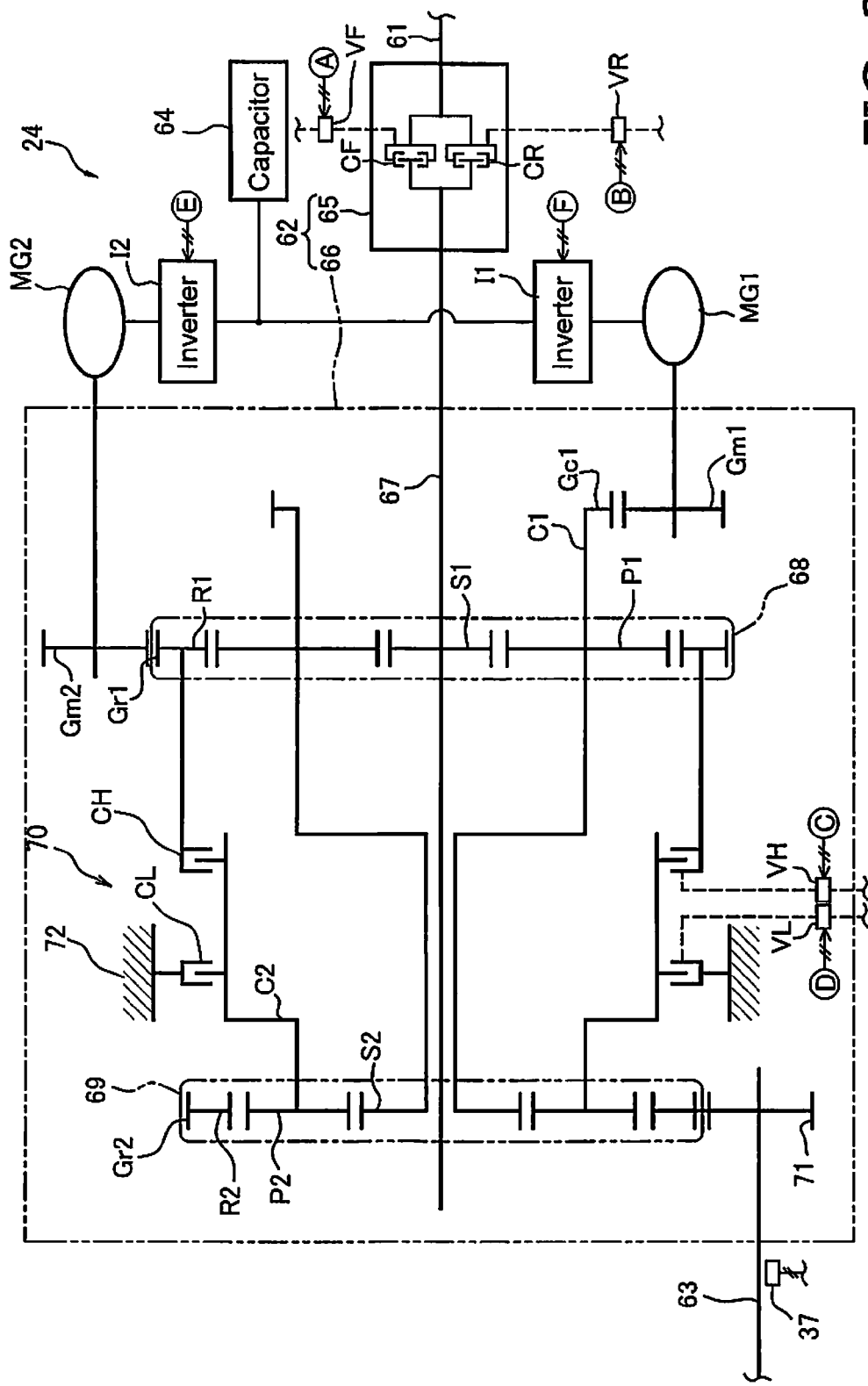
FIG. 3 is a schematic view of a configuration of a power transmission device.

An explanation of the configuration of the power transmission device 24 is provided in detail below. FIG. 3 is a schematic view of a configuration of the power transmission device 24. As illustrated in FIG. 3, the power transmission device 24 is provided with an input shaft 61, a gear mechanism 62, the output shaft 63, a first motor MG1, a second motor MG2, and a capacitor 64. The input shaft 61 is connected to the above mentioned PTO 22. The rotation from the engine 21 is inputted to the input shaft 61 via the PTO 22. The gear mechanism 62 transmits the rotation of the input shaft 61 to the output shaft 63. The output shaft 63 is connected to the above mentioned travel device 25, and transmits the rotation from the gear mechanism 62 to the above mentioned travel device 25.

The gear mechanism 62 is a mechanism for transmitting driving power from the engine 21. The gear mechanism 62 is configured so that the rotation speed ratio of the output shaft 63 with respect to the input shaft 61 is changed in response to changes in the rotation speeds of the motors MG1 and MG2. The gear mechanism 62 has a FR switch mechanism 65, and a speed change mechanism 66.

The FR switch mechanism 65 has a forward travel clutch CF (referred to below as "F-clutch CF"), a reverse travel clutch CR (referred to below as "R-clutch CR"), and various other gears not illustrated. The F-clutch CF and the R-clutch CR are hydraulic clutches and hydraulic fluid is supplied from the transmission pump 29 to the clutches CF and CR. The hydraulic fluid for the F-clutch CF is controlled by the F-clutch control valve VF. The hydraulic fluid for the R-clutch CR is controlled by the R-clutch control valve VR. The clutch control valves CF and CR are controlled by command signals from the control unit 27.

The direction of the rotation outputted from the FR switch mechanism 65 is switched due to the switching between connected/disconnected of the F-clutch CF and disconnected/connected of the R-clutch CR. Specifically, the F-clutch CF is connected and the R-clutch CR is disconnected when the vehicle is traveling forward. The F-clutch CF is disconnected and the R-clutch CR is connected when the vehicle is traveling in reverse.

The speed change mechanism 66 has a transmission shaft 67, a first planetary gear mechanism 68, a second planetary gear mechanism 69, a Hi/Lo switch mechanism 70, and an output gear 71. The transmission shaft 67 is coupled to the FR switch mechanism 65. The first planetary gear mechanism 68 and the second planetary gear mechanism 69 are disposed on the same shaft as the transmission shaft 67.

The first planetary gear mechanism 68 has a first sun gear S1, a plurality of first planet gears P1, a first carrier C1 that supports the plurality of first planet gears P1, and a first ring gear R1. The first sun gear S1 is coupled to the transmission shaft 67. The plurality of first planet gears P1 mesh with the first sun gear S1 and are supported in a rotatable manner by the first carrier C1. A first carrier gear Gc1 is provided on an outer peripheral part of the first carrier C1. The first ring gear R1 meshes with the plurality of first planet gears P1 and is able to rotate. A first ring outer periphery gear Gr1 is provided on the outer periphery of the first ring gear R1.

The second planetary gear mechanism 69 has a second sun gear S2, a plurality of second planet gears P2, a second carrier C2 that supports the plurality of second planet gears P2, and a second ring gear R2. The second sun gear S2 is coupled to the first carrier C1. The plurality of second planet gears P2 mesh with the second sun gear S2 and are supported in a rotatable manner by the second carrier C2. The second ring gear R2 meshes with the plurality of second planet gears P2 and is able to rotate. A second ring outer periphery gear Gr2 is provided on the outer periphery of the second ring gear R2. The second ring outer periphery gear Gr2 meshes with the output gear 71, and the rotation of the second ring gear R2 is outputted to the output shaft 63 via the output gear 71.

The Hi/Lo switch mechanism 70 is a mechanism for switching the transmission paths of the driving power of the power transmission device 24 between a high-speed mode (Hi mode) in which the vehicle speed is high and a low-speed mode (Lo mode) in which the vehicle speed is low. The Hi/Lo switch mechanism 70 has an H-clutch CH that is connected during the Hi mode and an L-clutch CL that is connected during the Lo mode. The H-clutch CH connects or disconnects the first ring gear R1 and the second carrier C2. The L-clutch CL connects or disconnects the second carrier C2 and a fixed end 72 to prohibit or allow the rotation of the second carrier C2.

The clutches CH and CL are hydraulic clutches, and hydraulic fluid from the transmission pump 29 is supplied to each of the clutches CH and CL. The hydraulic fluid for the H-clutch CH is controlled by an H-clutch control valve VH. The hydraulic fluid for the L-clutch CL is controlled by an L-clutch control valve VL. The clutch control valves VH and VL are controlled by command signals from the control unit 27.

The first motor MG1 and the second motor MG2 function as drive motors that generate driving power using electrical energy. The first motor MG1 and the second motor MG2 also function as generators that use inputted driving power to generate electrical energy. The first motor MG1 functions as a generator when a command signal from the control unit 27 is applied to activate torque in the reverse direction of the rotating direction of the first motor MG1. A first motor gear Gm1 is fixed to the output shaft of the first motor MG1 and the first motor gear Gm1 meshes with the first carrier gear Gc1. A first inverter I1 is connected to the first motor MG1 and a command signal for controlling the motor torque of the first motor MG1 is applied to the first inverter I1 from the control unit 27.

The second motor MG2 is configured in the same way as the first motor MG1. A second motor gear Gm2 is fixed to the output shaft of the second motor MG2 and the second motor gear Gm2 meshes with the first ring outer periphery gear Gr1. A second inverter I2 is connected to the second motor MG2 and a command signal for controlling the motor torque of the second motor MG2 is applied to the second inverter I2 from the control unit 27.

The capacitor 64 functions as an energy reservoir unit for storing energy generated by the motors MG1 and MG2. That is, the capacitor 64 stores electrical power generated by the motors MG1 and MG2 when the total electrical power generation amount of the motors MG1 and MG2 is high. The capacitor 64 releases electrical power when the total electrical power consumption amount of the motors MG1 and MG2 is high. That is, the motors MG1 and MG2 are driven by electrical power stored in the capacitor 64. Alternatively, the motors MG1 and MG2 can be driven using the electrical power stored in the capacitor 64. A battery may be used in place of a capacitor.

The control unit 27 receives detection signals from the various detecting units and applies command signals for indicating the command torques for the motors MG1 and MG2 to inverters I1 and I2. The control unit 27 may output rotation speed commands to the motors MG1 and MG2. In this case, the inverters I1 and I2 control the motors MG1 and MG2 by calculating command torques corresponding to the rotation speed commands. The control unit 27 also applies command signal for controlling the clutch hydraulic pressure of the clutches CF, CR, CH, and CL to the clutch control valves VF, VR, VH, and VL. As a result, the speed change ratio and the output torque of the power transmission device 24 are controlled. The following is an explanation of the operation of the power transmission device 24.

Figure 4:
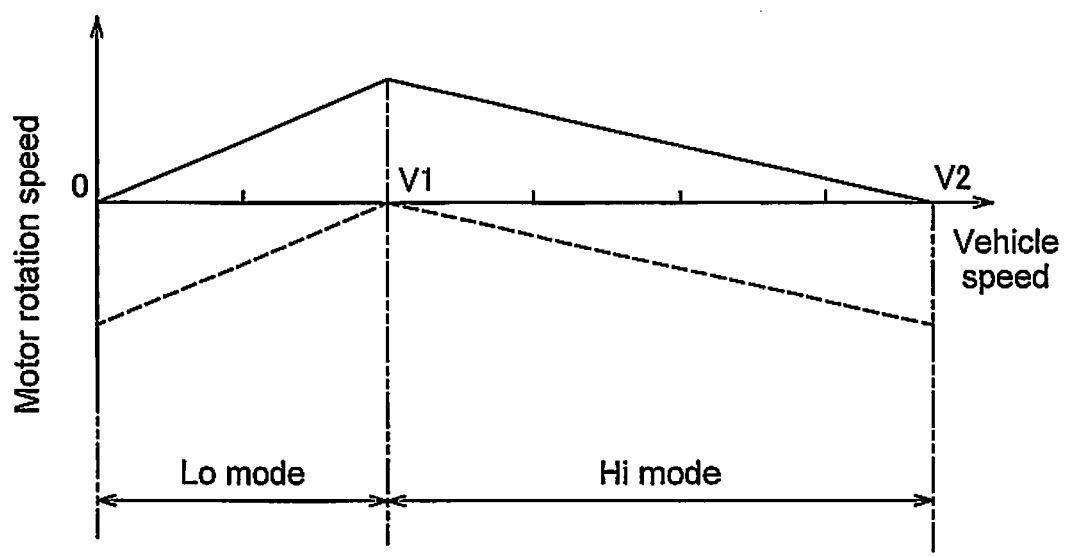
FIG. 4 illustrates changes in rotation speeds of a first motor and a second motor with respect to the vehicle speed.

An outline of an operation of the power transmission device 24 when the vehicle speed increases from zero in the forward travel side while the rotation speed of the engine 21 remains fixed, will be explained with reference to FIG. 4. FIG. 4 illustrates the rotation speeds of the motors MG1 and MG2 with respect to the vehicle speed. When the rotation speed of the engine 21 is fixed, the vehicle speed changes in response to the rotation speed ratio of the power transmission device 24. The rotation speed ratio is the ratio of the rotation speed of the output shaft 63 with respect to the rotation speed of the input shaft 61. Therefore, the variation in the vehicle speed in FIG. 4 matches the variation of the rotation speed ratio of the power transmission device 24. That is, FIG. 4 illustrates the relationship between the rotation speeds of the motors MG1 and MG2 and the rotation speed ratio of the power transmission device 24. The solid line in FIG. 4 represents the rotation speed of the first motor MG1, and the dashed line represents the rotation speed of the second motor MG2.

The L-clutch CL is connected and the H-clutch CH is disconnected in the region which the vehicle speed is between zero and V1 inclusive (Lo mode). Because the H-clutch CH is disconnected in the Lo mode, the second carrier C2 and the first ring gear R1 are disconnected. Because the L-clutch CL is connected, the second carrier C2 is fixed.

The driving power from the engine 21 in the Lo mode is inputted to the first sun gear S1 via the transmission shaft 67, and the driving power is outputted from the first carrier C1 to the second sun gear S2. Conversely, the driving power inputted to the first sun gear S1 is transmitted from the first planet gears P1 to the first ring gear R1 and outputted through the first ring outer periphery gear Gr1 and the second motor gear Gm2 to the second motor MG2. The second motor MG2 functions mainly as a generator in the Lo mode, and a portion of the electrical power generated by the second motor MG2 is stored in the capacitor 64. A portion of the electrical power generated by the second motor MG2 is consumed in the driving of the first motor MG1.

The first motor MG1 functions mainly as an electric motor in the Lo mode. The driving power of the first motor MG1 is outputted to the second sun gear S2 along a path from the first motor gear Gm1 to the first carrier gear Gc1 to the first carrier C1. The driving power outputted to the second sun gear S2 as described above is transmitted to the output shaft 63 along a path from the second planet gears P2 to the second ring gear R2 to the second ring outer periphery gear Gr2 to the output gear 71.

The H-clutch CH is connected and the L-clutch CL is disconnected in the region in which the vehicle speed exceeds V1 (Hi mode). Because the H-clutch CH is connected in the Hi mode, the second carrier C2 and the first ring gear R1 are connected. Because the L-clutch CL is disconnected, the second carrier C2 is disconnected. Therefore, the rotation speed of the first ring gear R1 and the second carrier C2 match.

The driving power from the engine 21 in the Hi mode is inputted to the first sun gear S1 and the driving power is outputted from the first carrier C1 to the second sun gear S2. The driving power inputted to the first sun gear S1 is outputted from the first carrier C1 through the first carrier gear Gc1 and the first motor gear Gm1 to the first motor MG1. The first motor MG1 functions mainly as a generator in the Hi mode, and thus a portion of the electrical power generated by the first motor MG1 is stored in the capacitor 64. A portion of the electrical power generated by the first motor MG1 is consumed in the driving of the second motor MG2.

The driving power of the second motor MG2 is outputted to the second carrier C2 along a path from the second motor gear Gm2 to the first ring outer periphery gear Gr1 to the first ring gear R1 to the H-clutch CH. The driving power outputted to the second sun gear S2 as described above is outputted through the second planet gears P2 to the second ring gear R2, and the driving power outputted to the second carrier C2 is outputted through the second planet gears P2 to the second ring gear R2. The driving power combined by the second ring gear R2 in this way is transmitted through the second ring outer periphery gear Gr2 and the output gear 71 to the output shaft 63.

While forward travel driving has been discussed above, the operations of reverse travel driving are the same. During braking, the roles of the first motor MG1 and the second motor MG2 as generator and motor are reversed from the above explanation.

The control of the power transmission device 24 by the control unit 27 is described in detail below. The control unit 27 controls the output torque of the power transmission device 24 by controlling the motor torque of the first motor MG1 and the second motor MG2. That is, the control unit 27 controls the tractive force of the work vehicle 1 by controlling the motor torque of the first motor MG1 and the second motor MG2. A method for determining the command values of the motor torques (referred to below as "command torques") to the first motor MG1 and the second motor MG2 is explained below.

Figure 5:
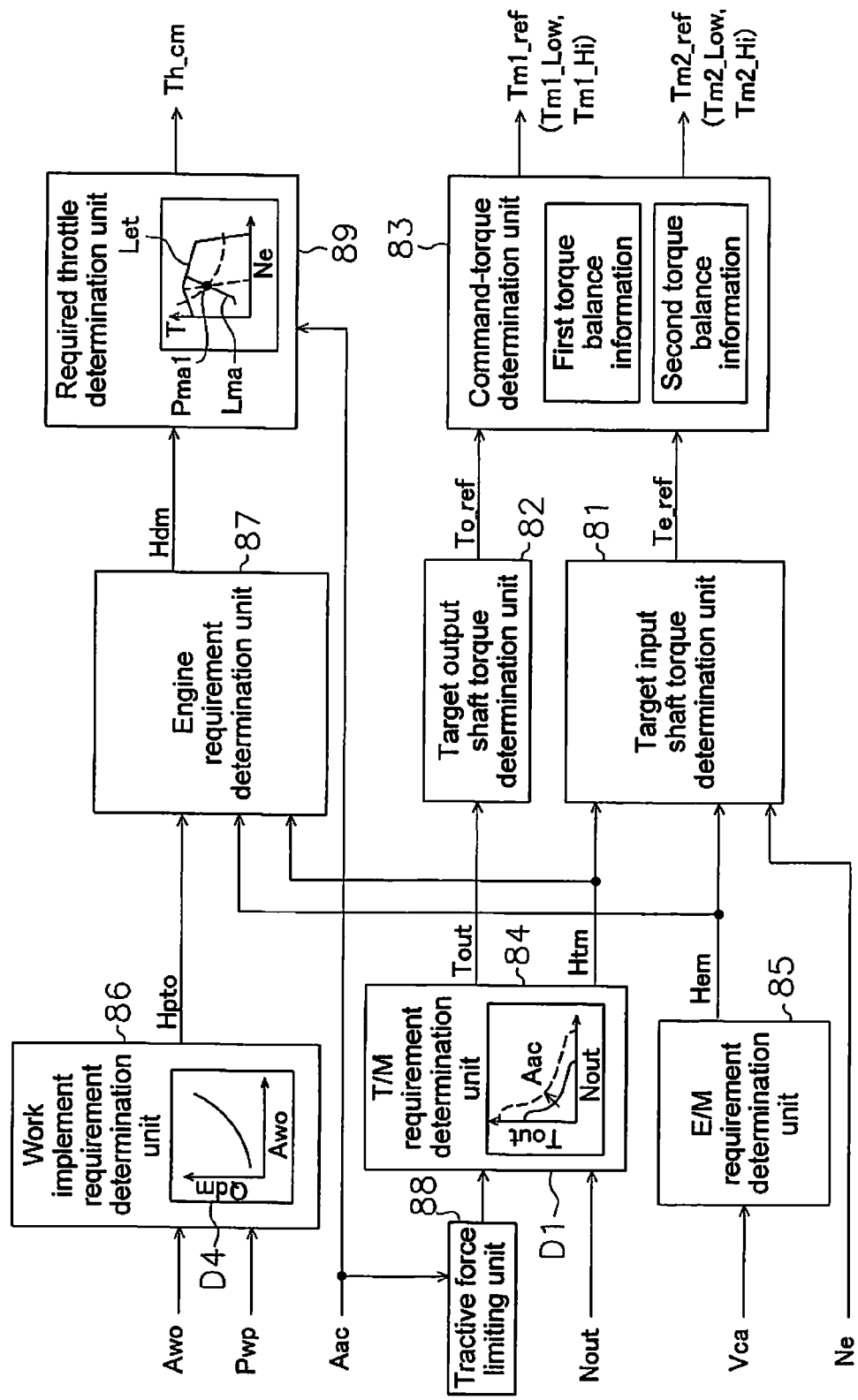
FIG. 5 is a block diagram illustrating a process for determining command torques for the motors.

FIG. 5 is a control block diagram illustrating processing executed by the control unit 27. The control unit 27 has a transmission requirement determination unit 84, an energy management requirement determination unit 85, and a work implement requirement determination unit 86 as illustrated in FIG. 5.

The transmission requirement determination unit 84 determines a required tractive force Tout on the basis of an accelerator operating amount Aac and an output rotation speed Nout. Specifically, the transmission requirement determination unit 84 determines the required tractive force Tout from the output rotation speed Nout on the basis of required tractive force characteristics information D1 stored in the storage unit 56. The required tractive force characteristics information D1 is data indicating the required tractive force characteristics that define the relationship between the output rotation speed Nout and the required tractive force Tout.

Figure 6:
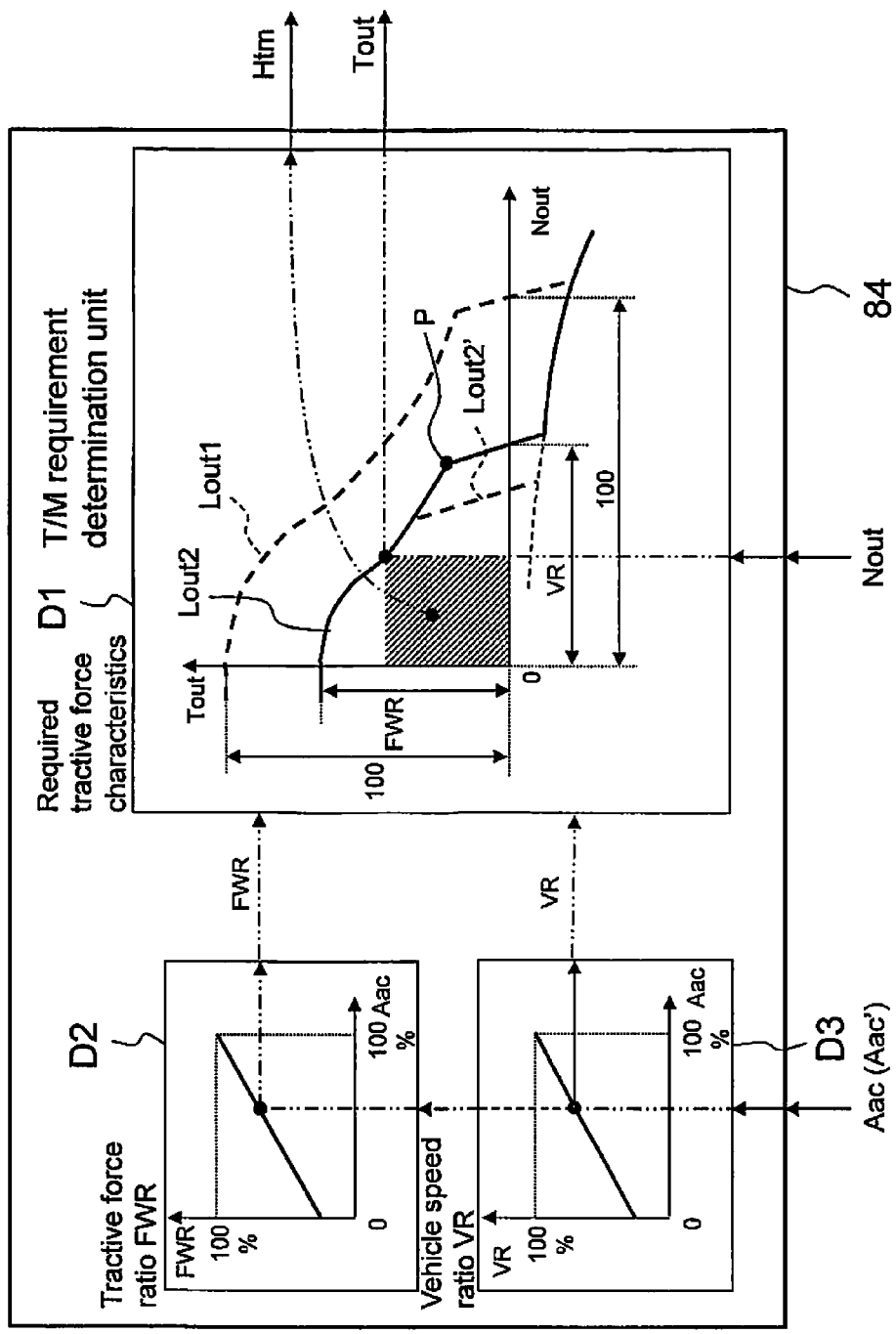
FIG. 6 is a block diagram illustrating processing by a transmission requirement determination unit.

Specifically as illustrated in FIG. 6, the storage unit 56 stores data Lout1 indicating basic required tractive force characteristics (referred to below as "basic tractive force characteristics Lout1"). The basic tractive force characteristics Lout1 are required tractive force characteristics when the accelerator operating amount Aac is at the maximum value, that is, at 100%. The basic tractive force characteristics Lout1 are determined in response to a speed range selected by the speed change operating member 53a. The transmission requirement determination unit 84 determines current required tractive force characteristics Lout2 by multiplying a tractive force ratio FWR and a vehicle speed ratio VR by the basic tractive force characteristics Lout1.

The storage unit 56 stores tractive force ratio information D2 and vehicle speed ratio information D3. The tractive force ratio information D2 defines the tractive force ratio FWR with respect to the accelerator operating amount Aac. The vehicle speed ratio information D3 defines the vehicle speed ratio VR with respect to the accelerator operating amount Aac. The transmission requirement determination unit 84 determines the tractive force ratio FWR and the vehicle speed ratio VR in response to the accelerator operating amount Aac. The transmission requirement determination unit 84 determines the current required tractive force characteristics Lout2 corresponding to the accelerator operating amount Aac by multiplying the basic tractive force characteristics Lout1 by the tractive force ratio FWR in the vertical axis direction which indicates the required tractive force and the vehicle speed ratio VR in the horizontal axis direction which indicates the output rotation speed Nout.

The tractive force ratio information D2 defines the tractive force ratio FWR which increases in correspondence to an increase in the accelerator operating amount Aac. The vehicle speed ratio information D3 defines the vehicle speed ratio VR which increases in correspondence to an increase in the accelerator operating amount Aac. However, the tractive force ratio FWR is greater than zero when the accelerator operating amount is zero. Similarly, the vehicle speed ratio VR is greater than zero when the accelerator operating amount Aac is zero. As a result, the required tractive force Tout is a value greater than zero even when the accelerator operating member 51a is not being operated. That is, tractive force is being outputted from the power transmission device 24 even when the accelerator operating member 51a is not being operated. As a result, a behavior similar to creep generated in a torque converter-type speed change device is materialized in the EMT-type power transmission device 24.

The required tractive force characteristics information D1 defines the required tractive force Tout that increases in response to a reduction in the output rotation speed Nout. When the above mentioned speed change operating member 53a is operated, the transmission requirement determination unit 84 changes the required tractive force characteristics in response to the speed range selected by the speed change operating member 53a. For example, when a down-shift is conducted using the speed change operating member 53a, the required tractive force characteristics information changes from Lout2 to Lout2' as illustrated in FIG. 6. As a result, the upper limit of the output rotation speed Nout is reduced. That is, the upper limit of the vehicle speed is reduced.

The required tractive force characteristics information D1 defines the required tractive force Tout as a negative value with respect to the output rotation speed Nout that is no less than the predetermined speed. As a result, the required tractive force Tout is determined as a negative value when the output rotation speed Nout is larger than the upper limit of the output rotation speed in the selected speed range. A braking force is generated when the required tractive force Tout is a negative value. As a result, a behavior similar to engine brake generated in a torque converter-type speed change device is materialized in the EMT-type power transmission device 24.

The energy management requirement determination unit 85 shown in FIG. 5 determines an energy management required horsepower Hem on the basis of the remaining amount of electrical power in the capacitor 64. The energy management required horsepower Hem is a horsepower required by the power transmission device 24 for charging the capacitor 64. The energy management requirement determination unit 85 determines a current capacitor capacity from a voltage Vca of the capacitor 64. The energy management requirement determination unit 85 increases the energy management required horsepower Hem as the current capacitor capacity becomes smaller.

The work implement requirement determination unit 86 determines a work implement required horsepower Hpto on the basis of a work implement pump pressure Pwp and an operating amount Awo (referred to below as "work implement operating amount Awo") of the work implement operating member 52a. In the present exemplary embodiment, the work implement required horsepower Hpto is a horsepower distributed to the work implement pump 23. However, the work implement required horsepower Hpto may include horsepower distributed to the steering pump 30 and/or the transmission pump 29.

Specifically, the work implement requirement determination unit 86 determines a required flow rate Qdm of the work implement pump 23 from the work implement operating amount Awo on the basis of required flow rate information D4. The required flow rate information D4 is stored in the storage unit 56 and defines the relationship between the required flow rate Qdm and the work implement operating amount Awo. The required flow rate information D4 defines the relationship between the required flow rate Qdm and the work implement operating amount Awo so that the required flow rate Qdm increases in correspondence with an increase in the work implement operating amount Awo. The work implement requirement determination unit 86 determines the work implement required horsepower Hpto from the required flow rate Qdm and the work implement pump pressure Pwp.

The control unit 27 has a target output shaft torque determination unit 82, a target input shaft torque determination unit 81, and a command-torque determination unit 83.

The target output shaft torque determination unit 82 determines a target output shaft torque To_ref. The target output shaft torque To_ref is a target value for the torque to be outputted from the power transmission device 24. The target output shaft torque determination unit 82 determines the target output shaft torque To_ref on the basis of the required tractive force Tout determined by the transmission requirement determination unit 84. That is, the target output shaft torque To_ref is determined so that the tractive force outputted from the power transmission device 24 conforms to the required tractive force characteristics defined by the required tractive force characteristics information D1. Specifically, the target output shaft torque To_ref is determined by multiplying the required tractive force Tout by a predetermined distribution ratio. The predetermined distribution ratio is set, for example, so that the total of the work implement required horsepower Hpto, the transmission required horsepower Htm, and the energy management required horsepower Hem does not exceed the output horsepower from the engine 21.

The target input shaft torque determination unit 81 determines a target input shaft torque Te_ref. The target input shaft torque Te_ref is a target value for the torque to be inputted to the power transmission device 24. The target input shaft torque determination unit 81 determines the target input shaft torque Te_ref on the basis of the transmission required horsepower Htm and the energy management required horsepower Hem. Specifically the target input shaft torque determination unit 81 calculates the target input shaft torque Te_ref by multiplying the engine rotation speed by the sum of the energy management required horsepower Hem and the value of the transmission required horsepower Htm multiplied by the predetermined distribution ratio. The transmission required horsepower Htm is calculated by multiplying the above mentioned required tractive force Tout by the current output rotation speed Nout.

The command-torque determination unit 83 uses torque-balance information to determine command torques Tm1_ref and Tm2_ref for the motors MG1 and MG2 from the target input shaft torque Te_ref and the target output shaft torque To_ref. The torque-balance information defines a relationship between the target input shaft torque Te_ref and the target output shaft torque To_ref so as to achieve a balance of the torques of the power transmission device 24. The torque-balance information is stored in the storage unit 56.

As described above, the transmission paths of the driving power in the power transmission device 24 are different for the Lo mode and the Hi mode. As a result, the command-torque determination unit 83 uses different torque-balance information to determine the command torques Tm1_ref and Tm2_ref for the motors MG1 and MG2 in the Lo mode and the Hi mode. Specifically, the command-torque determination unit 83 uses first torque-balance information represented by equation 1 below to determine command torques Tm1_Low and Tm2_Low for the motors MG1 and MG2 in the Lo mode. In the present exemplary embodiment, the first torque-balance information is an equation for balancing the torques of the power transmission device 24.

$$Ts1\_Low = Te\_ref * r\_fr$$

$$Tc1\_Low = Ts1\_Low * (-1) * ((Zr1/Zs1) + 1)$$

$$Tr2\_Low = To\_ref * (Zod/Zo)$$

$$Ts2\_Low = Tr2\_Low * (Zs2/Zr2)$$

$$Tcp1\_Low = Tc1\_Low = Ts2\_Low$$

$$Tm1\_Low = Tcp1\_Low * (-1) * (Zp1/Zp1d)$$

$$Tr1\_Low = Ts1\_Low * (Zr1/Zs1)$$

$$Tm2\_Low = Tr1\_Low * (-1) * (Zp2/Zp2d) \qquad \text{Equation 1}$$

The command-torque determination unit 83 uses second torque-balance information represented by equation 2 below to determine command torques Tm1_Hi and Tm2_Hi for the motors MG1 and MG2 in the Hi mode. In the present exemplary embodiment, the second torque-balance information is an equation for balancing the torques of the power transmission device 24.

$$Ts1\_Hi = Te\_ref * r\_fr$$

$$Tc1\_Hi = Ts1\_Hi * (-1) * ((Zr1/Zs1) = 1)$$

$$Tr2\_Hi = To\_ref * (Zod/Zo)$$

$$Ts2\_Hi = Tr2\_Hi * (Zs2/Zr2)$$

$$Tcp1\_Hi = Tc1\_Hi + Ts2\_Hi$$

$$Tm1\_Hi = Tcp1\_Hi * (-1) * (Zp1/Zp1d)$$

$$Tr1\_Hi = Ts1\_Hi * (Zr1/Zs1)$$

$$Tc2\_Hi = Tr2\_Hi * (-1) * ((Zs2/Zr2) + 1)$$

$$Tcp2\_Hi = Tr1\_Hi + Tc2\_Hi$$

$$Tm2\_Hi = Tcp2\_Hi * (-1) * (Zp2/Zp2d) \qquad \text{Equation 2}$$

The contents of the parameters in the respective torque-balance information are depicted in Table 1 below.

TABLE 1

| | |
|---|---|
| Te_ref | Target input shaft torque |
| To_ref | Target output shaft torque |
| r_fr | Deceleration ratio for the FR switch mechanism 65 (The FR switch mechanism 65 decelerates the engine rotation speed at 1/r_fr and output it. When the FR switch mechanism 65 is in the forward travel state, r_fr is a negative value. When the FR switch mechanism 65 is in the reverse travel state, r_fr is a positive value.) |
| Zs1 | Number of teeth of the sun gear S1 in the first planetary gear mechanism 68. |
| Zr1 | Number of teeth of the ring gear R1 in the first planetary gear mechanism 68. |
| Zp1 | Number of teeth in the first carrier gear Gc1 |
| Zp1d | Number of teeth of the first motor gear Gm1 |
| Zs2 | Number of teeth of the sun gear S2 in the second planetary gear mechanism 69. |
| Zr2 | Number of teeth of the ring gear R2 in the second planetary gear mechanism 69. |
| Zp2 | Number of teeth of the first ring outer periphery gear Gr1 |
| Zp2d | Number of teeth of the second motor gear Gm2 |
| Zo | Number of teeth of the second ring outer periphery gear Gr2 |
| Zod | Number of teeth of the output gear 71 |

The control of the engine 21 by the control unit 27 is described in detail below. As described above, the control unit 27 controls the engine 21 by transmitting command signals to the fuel injection device 28. A method for determining the command throttle values for the fuel injection device 28 will be explained below. The control unit 27 has an engine requirement determination unit 87 and a required throttle determination unit 89.

The engine requirement determination unit 87 determines the engine required horsepower Hdm on the basis of the work implement required horsepower Hpto, the transmission required horsepower Htm, and the energy management required horsepower Hem. Specifically, the engine requirement determination unit 87 determines an engine required horsepower Hdm by adding the work implement required horsepower Hpto, the transmission required horsepower Htm, and the energy management required horsepower Hem.

Figure 7:
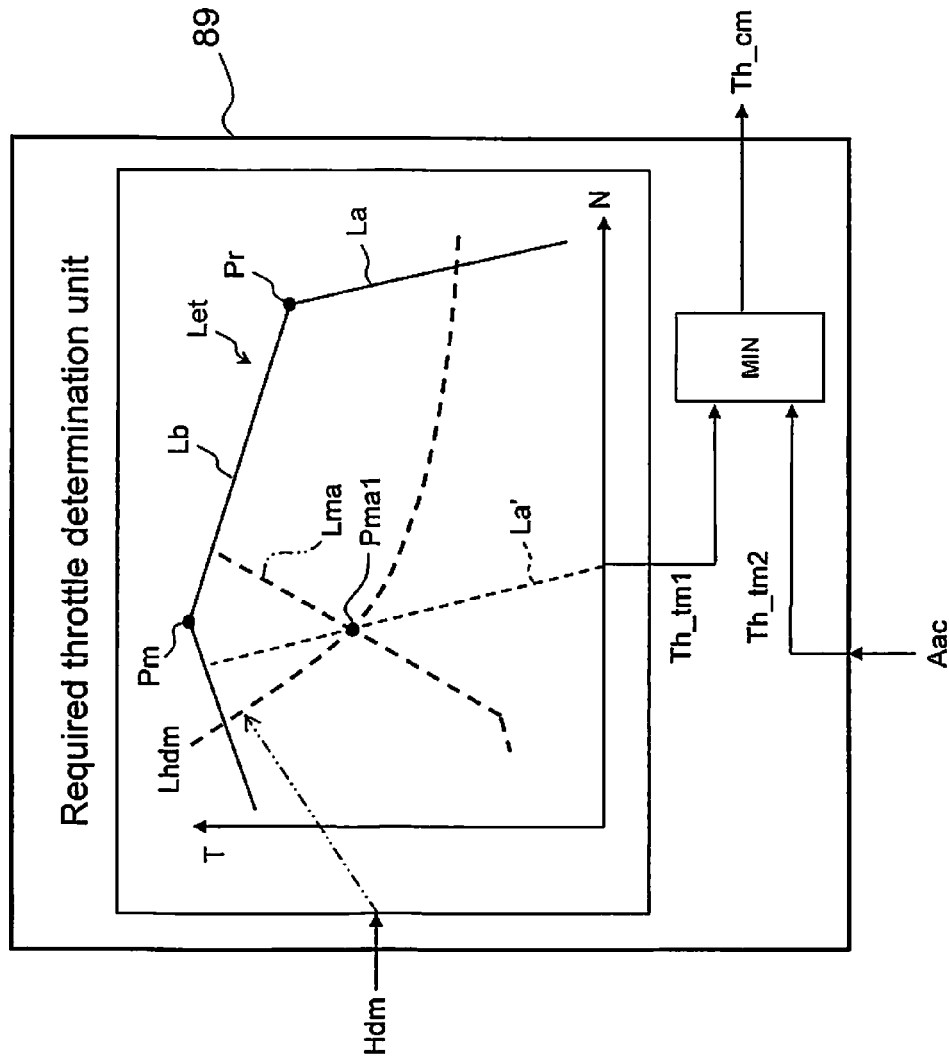
FIG. 7 is a block diagram illustrating processing by a required throttle determination unit.

The required throttle determination unit 89 determines a command throttle value Th_cm from the engine required horsepower Hdm and the accelerator operating amount Aac. Specifically, the storage unit 56 stores an engine torque line Let and a matching line Lma as illustrated in FIG. 7. The engine torque line Let defines a relationship between the output torque of the engine 21 and the engine rotation speed Ne. The engine torque line Let includes a regulation region La and a full load region Lb. The regulation region La changes in response to the command throttle value Th_cm (see La' in FIG. 7). The full load region Lb includes a rated point Pr and a maximum torque point Pm located on the low engine rotation speed side from the rated point Pr.

The matching line Lma is information for determining a first required throttle value Th_tm1 from the engine required horsepower Hdm. While the matching line Lma can be set optionally, the matching line Lma in the present embodiment is set so as to pass through a position closer to the maximum torque point Pm than the rated point Pr in the full load region Lb of the engine torque line Let.

The required throttle determination unit 89 determines the first required throttle value Th_tm1 so that the engine torque line Let and the matching line Lma match at a matching point Pm1 where the output torque of the engine 21 becomes the torque corresponding to the engine required horsepower Hdm. That is, the intersection of the matching line Lma and an equivalent horsepower line Lhdm corresponding to the engine required horsepower Hdm is set as a first matching point Pma1, and the required throttle determination unit 89 determines the first required throttle value Th_tm1 so that the regulation region (see "La") of the engine torque line Let passes through the first matching point Pma1.

The required throttle determination unit 89 determines the lowest of the first required throttle value Th_tm1 and a second required throttle value Th_tm2 corresponding to the accelerator operating amount Aac, as the command throttle value Th_cm.

The following is an explanation of the tractive force limit control during excavation. As illustrated in FIG. 5, the control unit 27 has a tractive force limiting unit 88. The tractive force limiting unit 88 executes a tractive force limit control during excavation while the work vehicle 1 is excavating.

When the height of the boom 11 is equal to or less than a predetermined height threshold and the bottom pressure of the lift cylinder 13 is equal to or greater than a predetermined pressure threshold, the tractive force limiting unit 88 determines that the work vehicle 1 is excavating.

Figure 8:
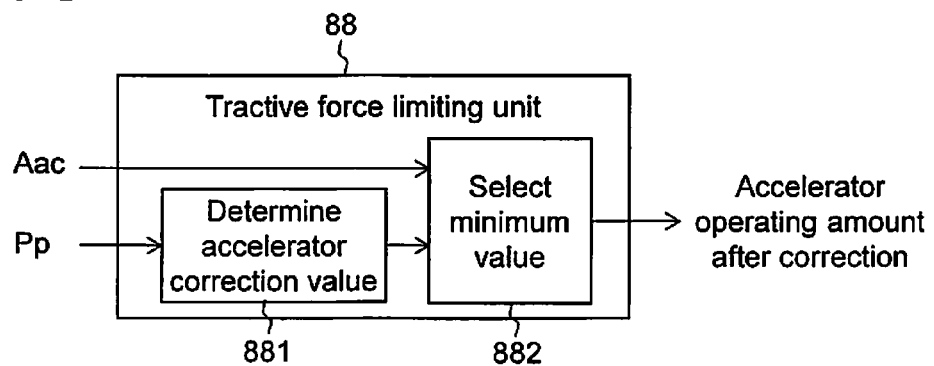
FIG. 8 is a block diagram illustrating processing by a tractive force limiting unit.

The tractive force limit control during excavation involves the tractive force limiting unit 88 reducing the required tractive force outputted by the transmission requirement determination unit 84 to a value lower than a value corresponding to the accelerator operating amount Aac. Specifically, while the tractive force limit control during excavation, the tractive force limiting unit 88 corrects the accelerator operating amount Aac to a value less than the actual operating amount, and outputs the corrected value to the transmission requirement determination unit 84. As illustrated in FIG. 8, the tractive force limiting unit 88 has a correction value determining unit 881 and a minimum value selecting unit 882. The correction value determining unit 881 determines a corrected value Aac' of the accelerator operating amount Aac (referred to below as "accelerator corrected value Aac'"). The accelerator corrected value Aac' is determined in response to a work implement pump pressure Pp. The method for determining the accelerator corrected value Aac' is described below.

The minimum value selecting unit 882 compares the accelerator operating amount Aac and the accelerator corrected value Aac' and then selects the lowest thereof as the accelerator operating amount after correction. Therefore, when the accelerator corrected value Aac' determined in response to the work implement pump pressure Pp is less than the accelerator operating amount Aac detected by the accelerator operation detecting unit 51b, the accelerator corrected value Aac' is determined as the accelerator operating amount after correction. That is, the accelerator operating amount Aac is corrected to a reduced value. When the accelerator corrected value Aac' determined in response to the work implement pump pressure Pp is equal to or higher than the accelerator operating amount Aac detected by the accelerator operation detecting unit 51b, the accelerator operating amount Aac detected by the accelerator operation detecting unit 51b is determined as the accelerator operating amount after correction. That is, the reduction of the accelerator operating amount Aac is not performed. The above mentioned transmission requirement determination unit 84 determines the required tractive force on the basis of the accelerator operating amount after correction. Therefore, when the accelerator corrected value Aac' is determined as the accelerator operating amount after correction, the required tractive force is reduced to a value lower than the value corresponding to the accelerator operating amount Aac. The above mentioned required throttle determination unit 89 determines the command throttle value Th_cm from the engine required horsepower Hdm and the actual accelerator operating amount Aac that has not been corrected. However, the engine required horsepower Hdm is determined on the basis of the transmission required horsepower Htm determined from the accelerator operating amount after correction.

Figures 9, 10:
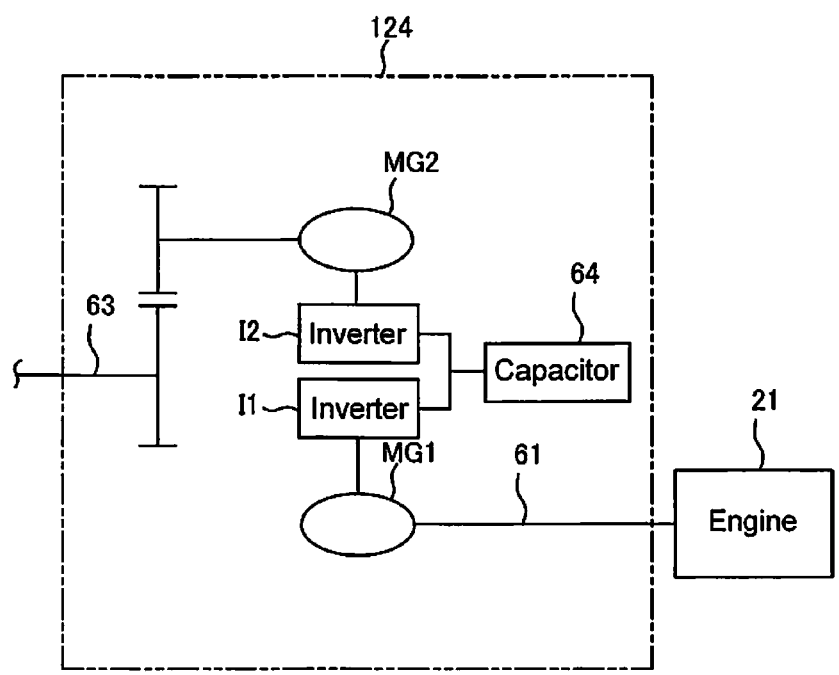
FIG. 9 is a table depicting acceleration correction information during excavating.
FIG. 10 is a schematic view illustrating a power transmission device according to a modified exemplary embodiment.

The method for determining the accelerator corrected value Aac' is described below. The storage unit 56 stores excavation acceleration correction information which indicates a relationship between the work implement pump pressure Pp and the accelerator corrected value Aac'. An example of the excavation acceleration correction information is depicted in FIG. 9. The excavation acceleration correction information is a table which defines the relationship between the work implement pump pressure Pp and the accelerator corrected value Aac'. However, the format of the excavation acceleration correction information may be in a format that differs from a table such as a map or an equation. The accelerator corrected value Aac' is depicted as a percentage with zero as the minimum and 100 as the maximum in the same way as the accelerator operating amount Aac.

As illustrated in FIG. 9, the accelerator corrected value Aac' is 100% when the work implement pump pressure Pp is zero. Pp1 to Pp4 in FIG. 9 represent predetermined numerical values and have a relationship such that $0<Pp1<Pp2<Pp3<Pp4$. Aac1' to Aac4' represent predetermined numerical values and have a relationship such that $Aac1' \geq Aac2' \geq Aac3' \geq Aac4'$. Therefore, the accelerator corrected value Aac' decreases in correspondence to an increase in the work implement pump pressure Pp. However, the accelerator corrected value Aac1' when the work implement pump pressure Pp is Pp1 is 100%. Therefore, the correction to reduce the accelerator operating amount Aac is not carried out when the work implement pump pressure Pp is equal to or less than Pp1. The correction of the accelerator operating amount Aac corresponding to the work implement pump pressure Pp is carried out when the work implement pump pressure Pp is greater than Pp1.

The work vehicle 1 according to the present exemplary embodiment has the following features.

During excavation, the required tractive force is reduced to a value less than a value corresponding to the accelerator operating amount Aac. The command torques of the first motor MG1 and the second motor MG2 are determined in response to the reduced required tractive force. As a result, the tractive force of the work vehicle 1 is reduced to a value less than the value corresponding to the accelerator operating amount Aac to prevent a load on the work implement 3 from becoming large excessively. As a result, a balance can be achieved between the tractive force of the vehicle and the driving power of the work implement 3 with a simple operation in the work vehicle 1 according to the present exemplary embodiment.

The reduction of the tractive force by the tractive force limiting unit 88 is carried out by correcting the accelerator operating amount Aac to the accelerator corrected value Aac' which is less than the actual operating amount. As a result, the tractive force of the vehicle can be reduced with a simple control.

The accelerator corrected value Aac' is set to a value less than 100% when the work implement pump pressure Pp is greater than the predetermined threshold Pp1. Therefore, the tractive force limiting unit 88 reduces the required tractive force to a value less than the value corresponding to the accelerator operating amount Aac when the work implement pump pressure Pp is greater than the predetermined threshold Pp1. The work implement pump pressure Pp fluctuates in response to the size of the load on the work implement 3. Therefore, by reducing the required tractive force when the work implement pump pressure Pp is greater than the predetermined threshold Pp1, the tractive force can be reduced when a large load is applied to the work implement. As a result, the balance between the tractive force of the vehicle and the driving power of the work implement 3 can be achieved in a suitable manner.

The accelerator corrected value Aac' is set to be a smaller value in response to an increase in the work implement pump pressure Pp when the work implement pump pressure Pp is greater than the predetermined threshold Pp1. Therefore, the tractive force limiting unit 88 reduces the required tractive force in response to the work implement pump pressure Pp when the work implement pump pressure Pp is greater than the predetermined threshold Pp1. As a result, the tractive force can be adjusted in response to the size of the load applied to the work implement 3.

The required throttle determination unit 89 determines the command throttle value Th_cm for the engine 21 on the basis of the engine required horsepower. The engine requirement determination unit 87 determines the engine required horsepower on the basis of the transmission required horsepower, which is determined on the basis of the required tractive force, and the work implement required horsepower, which is determined on the basis of the operating amount of the work implement operating member 52a. In this case, the engine required horsepower is determined as a value required for achieving the work implement required horsepower even when the tractive force limiting unit 88 reduces the required tractive force. Therefore, the required work implement required horsepower can be assured even if the tractive force limiting unit 88 reduces the required tractive force. For example, when the tractive force is reduced due to the command throttle for the engine being limited as in a conventional work vehicle, the driving power of the work implement pump is reduced due to a reduction in the engine rotation speed. As a result, it is difficult to assure a required work implement required horsepower. In comparison to the conventional work vehicle, the required work implement required horsepower can be assured easily in the work vehicle 1 according to the present exemplary embodiment.

The present invention is not limited to the above exemplary embodiments and various changes and modifications may be made without departing from the spirit of the invention.

The present invention is not limited to the above mentioned wheel loader and may be applied to another type of work vehicle, such as a bulldozer, a tractor, a forklift, or a motor grader.

The configuration of the power transmission device 24 is not limited to the configuration of the above exemplary embodiments. For example, the coupling and disposition of the elements of the two planetary gear mechanisms 68 and 69 are not limited to the coupling and disposition of the above exemplary embodiments. However, the number of the planetary gear mechanisms provided in the power transmission device 24 is not limited to two. The power transmission device 24 may only have one planetary gear mechanism. Alternatively, the power transmission device 24 may have three or more planetary gear mechanisms.

The control of the power transmission device 24 is not limited to the control of the above exemplary embodiment. That is in the present exemplary embodiment, the target input shaft torque Te_ref and the target output shaft torque To_ref are determined so that predetermined vehicle speed—tractive force characteristics can be achieved in which the tractive force changes continuously in response to the vehicle speed. However, the target input shaft torque Te_ref and the target output shaft torque To_ref may be set optionally.

The torque-balance information is not limited to the equations for balancing the torque as in the above exemplary embodiment. For example, the torque-balance information may be in the format of a table or a map.

The work implement pump is not limited to one and two or more work implement pumps may be provided. In this case, the above mentioned discharge capacity is the sum of the discharge capacities of the plurality of work implement pumps.

The reduction of the tractive force in the tractive force limit control during excavation is not limited to the method of correcting the accelerator operating amount Aac, and another method may be used. For example, the tractive force ratio FWR may be changed in response to the work implement pump pressure Pp. Alternatively, the vehicle speed ratio VR may be changed in response to the work implement pump pressure Pp.

The reduction of the tractive force in the tractive force limit control during excavation is not limited to being carried out in response to the work implement pump pressure Pp. The reduction of the tractive force in the tractive force limit control during excavation may be carried out in response to an increase in another parameter which indicates the load in the work implement 3. For example, the reduction of the tractive force in the tractive force limit control during excavation may be carried out in response to the work implement operating amount. Alternatively, the load on the work implement 3 may be determined on the basis of the tractive force and the acceleration of the work vehicle 1 and then the reduction of the tractive force in the tractive force limit control during excavation may be carried out in response to the determined load on the work implement 3. The load on the work implement 3 may be determined on the basis of the tractive force and the vehicle speed of the work vehicle 1.

The power transmission device is not limited to a so-called split system device using the planetary gear mechanism as described above, and may use a device of another system. For example, FIG. 10 is a schematic view illustrating a power transmission device 124 according to a modified exemplary embodiment. The power transmission device 124 illustrated in FIG. 10 is a so-called series system power transmission device. The engine 21 is only used in the generation of electrical power by the first motor MG1 in the power transmission device 124. The second motor MG2 uses the electrical power generated in the first motor MG1 to drive the travel device. The second motor MG2 also generates electricity by recovering energy during deceleration. Configurations that are the same in the above mentioned embodiment are provided with the same reference numerals in FIG. 10 and explanations thereof are omitted.

Figures 11, 12:
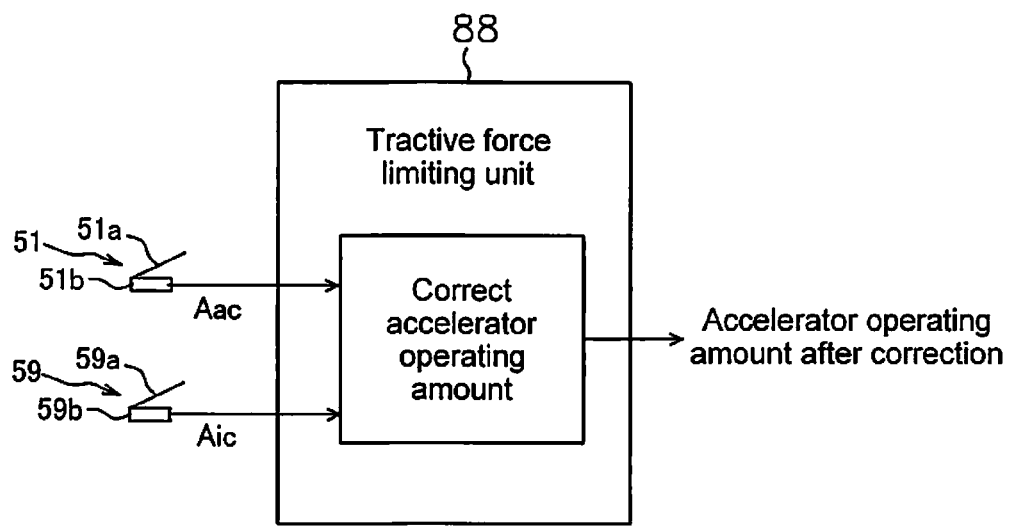
FIG. 11 is a block diagram illustrating processing by a tractive force limiting unit according to another exemplary embodiment.
FIG. 12 is a table for indicating acceleration correction information during inching.

When the work vehicle 1 is provided with an inching operation member, the tractive force limiting unit 88 may carry out control (referred to below as "tractive force limit control during inching") so that the tractive force is limited when the inching operation member is operated. As illustrated in FIG. 11, the work vehicle 1 is provided with an inching operation device 59. The inching operation device 59 has an inching operation member 59a and an inching operation detecting unit 59b. The inching operation member 59a is operated to reduce the tractive force. The inching operation detecting unit 59b detects an operating amount of the inching operation member 59a (referred to below as "inching operating amount"). For example, the inching operating amount is displayed as a percentage with the minimum value being zero and the maximum value being 100. The inching operation detecting unit 59b transmits a detection signal indicating the inching operating amount to the control unit 27.

The tractive force limiting unit 88 in the tractive force limit control during inching determines the accelerator operating amount Aac' after correction using the following equation.

$$Aac' = (Aac - a) * Rac + a \qquad \text{Equation 3}$$

where, Aac' is the accelerator operating amount after correction; Aac is the accelerator operating amount Aac detected by the accelerator operation detecting unit 51b; a is a predetermined fixed value; and Rac is an acceleration correction ratio. The acceleration correction ratio is a value greater than or equal to or less than one, and is determined in response to the inching operating amount.

The storage unit 56 stores inching acceleration correction information for defining the relationship between the inching operating amount and the acceleration correction ratio. An example of the inching acceleration correction information is depicted in FIG. 12. As illustrated in FIG. 12, the inching acceleration correction information is a table for defining the relationship between the inching operating amount and the acceleration correction ratio. However, the format of the inching acceleration correction information is not limited to a table and may be a map or an equation.

As illustrated in FIG. 12, the acceleration correction ratio is one when the inching operating amount is zero in the inching acceleration correction information. Therefore, the accelerator operating amount Aac is not corrected when the inching operating amount is zero. Aic1 to Aic4 depicted in FIG. 12 are predetermined numerical values and represent a relationship such that $0 < Aic1 < Aic2 < Aic3 < Aic4$. Rac1 to Rac4 are predetermined numerical values and represent a relationship such that $Rac1 \geq Rac2 \geq Rac3 \geq Rac4$. However, Rac1 is one. Therefore, when the inching operating amount is greater than Aic1, the acceleration correction ratio is reduced in correspondence to an increase in the inching operating amount. That is, the tractive force is reduced in correspondence to an increase in the inching operating amount.

The operator is able to adjust the tractive force by operating the inching operation member 59a due to the above mentioned tractive force limit control during inching.

According to the present invention, a work vehicle and a control method for the same can be provided that are able to maintain balance between the tractive force of the vehicle and the driving power of the work implement with a simple operation.

What is claimed is:

1. A work vehicle, comprising:
an engine;
a hydraulic pump driven by the engine;
a work implement driven by hydraulic fluid discharged from the hydraulic pump;
a power transmission device having an electric motor;
a travel device that causes the vehicle to travel due to driving power outputted from the power transmission device;
an accelerator operating member; and
a control unit configured to control the power transmission device;
the control unit including
a transmission requirement determination unit for determining, on the basis of an operating amount of the accelerator operating member, a required tractive force that is a target tractive force of the travel device;
a command-torque determination unit for determining an output torque of the electric motor so that the tractive force of the vehicle reaches the required tractive force; and
a tractive force limiting unit for reducing the required tractive force to a value lower than a value corresponding to the operating amount of the accelerator operating member while the vehicle is excavating.

2. The work vehicle according to claim 1, wherein
the tractive force limiting unit corrects the operating amount of the accelerator operating member to a value smaller than the actual operating amount while the vehicle is excavating; and
the transmission requirement determination unit determines the required tractive force on the basis of the corrected operating amount of the accelerator operating member.

3. The work vehicle according to claim 1, wherein
the tractive force limiting unit reduces the required tractive force to a value less than a value corresponding to the operating amount of the accelerator operating member while the vehicle is excavating and when a discharge pressure of the hydraulic pump is greater than a predetermined threshold.

4. The work vehicle according to claim 1, wherein
the tractive force limiting unit reduces the required tractive force in response to the discharge pressure of the hydraulic pump.

5. The work vehicle according to claim 1, further comprising
a work implement operating member for operating the work implement;
the control unit including
an engine requirement determination unit for determining an engine required horsepower; and a required throttle determination unit for determining a command throttle value for the engine on the basis of the engine required horsepower; and the engine requirement determination unit determining the engine required horsepower on the basis of a transmission required horsepower, which is determined on the basis of the required tractive force, and a work implement required horsepower, which is determined on the basis of an operating amount of the work implement operating member.

6. The work vehicle according to claim 1, wherein the power transmission device further has an input shaft and an output shaft and transmits driving power from the engine to the travel device; and the power transmission device is configured to change a rotation speed ratio of the output shaft with respect to the input shaft by changing the rotation speed of the electric motor.

7. The work vehicle according to claim 2, wherein the tractive force limiting unit reduces the required tractive force to a value less than a value corresponding to the operating amount of the accelerator operating member while the vehicle is excavating and when a discharge pressure of the hydraulic pump is greater than a predetermined threshold.

8. The work vehicle according to claim 7, wherein the tractive force limiting unit reduces the required tractive force in response to the discharge pressure of the hydraulic pump.

9. The work vehicle according to claim 8, further comprising a work implement operating member for operating the work implement;

the control unit including an engine requirement determination unit for determining an engine required horsepower; and a required throttle determination unit for determining a command throttle value for the engine on the basis of the engine required horsepower; and the engine requirement determination unit determining the engine required horsepower on the basis of a transmission required horsepower, which is determined on the basis of the required tractive force, and a work implement required horsepower, which is determined on the basis of an operating amount of the work implement operating member.

10. The work vehicle according to claim 9, wherein the power transmission device further has an input shaft and an output shaft and transmits driving power from the engine to the travel device; and the power transmission device is configured to change a rotation speed ratio of the output shaft with respect to the input shaft by changing the rotation speed of the electric motor.

11. A control method for a work vehicle comprising an engine, a hydraulic pump driven by the engine, a work implement driven by hydraulic fluid discharged from the hydraulic pump, a power transmission device having an electric motor, a travel device for causing a vehicle to travel due to the driving power outputted by the power transmission device, and an accelerator operating member, the control method comprising:

a step for determining a required tractive force which is a target tractive force of the travel device on the basis of an operating amount of the accelerator operating member;

a step for determining an output torque of the electric motor so that the tractive force of the vehicle reaches the required tractive force; and a step for reducing the required tractive force to a value lower than a value corresponding to the operating amount of the accelerator operating member while the vehicle is excavating.

\* \* \* \* \*